Figure 1:
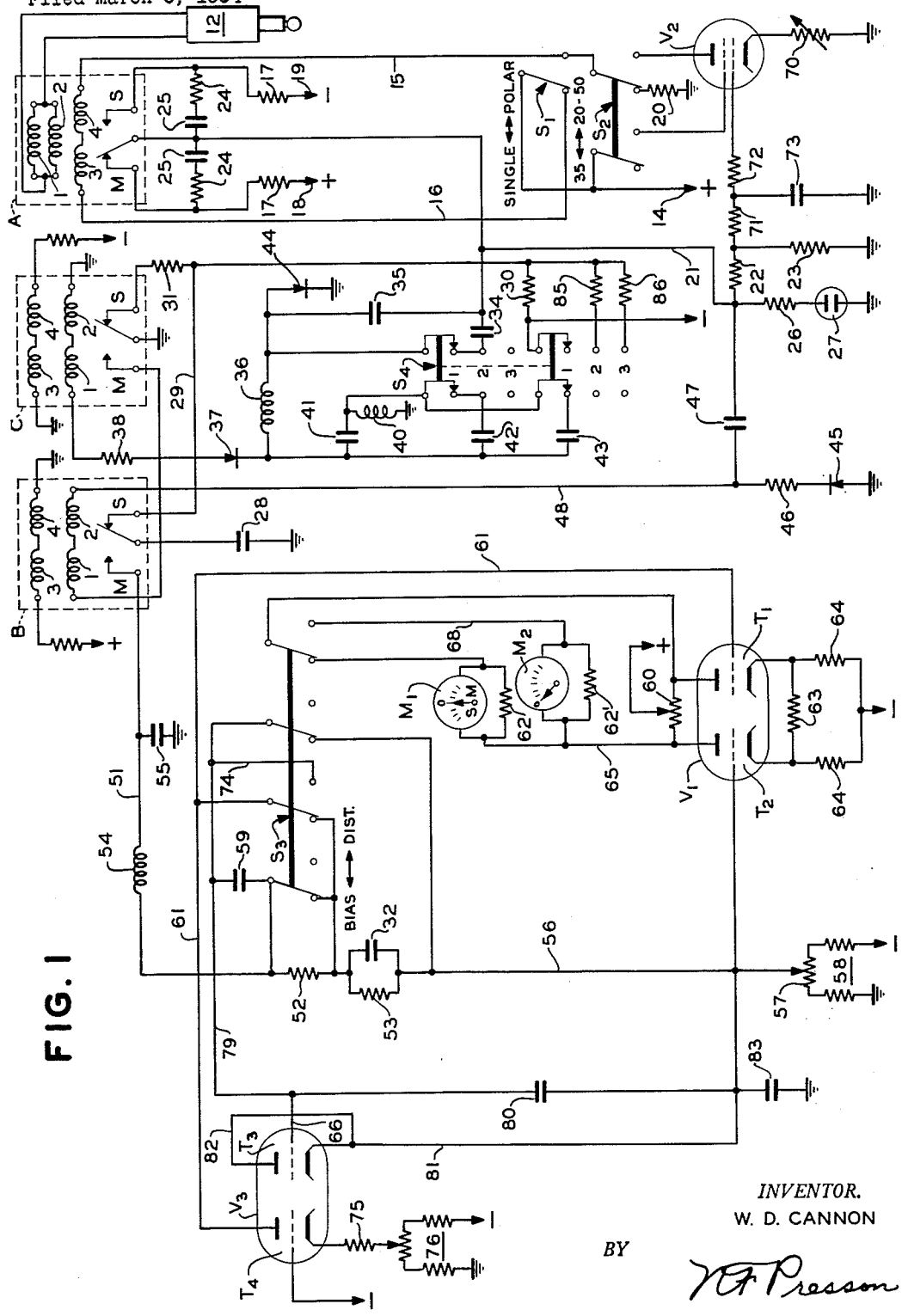

Aug. 9, 1955 W. D. CANNON 2,715,157
TELEGRAPH SIGNAL BIAS AND DISTORTION METER
Filed March 5, 1954 2 Sheets-Sheet 1

INVENTOR.
W. D. CANNON
BY
*N. F. Presson*
ATTORNEY

Aug. 9, 1955 W. D. CANNON 2,715,157
TELEGRAPH SIGNAL BIAS AND DISTORTION METER
Filed March 5, 1954 2 Sheets-Sheet 2

INVENTOR.
W. D. CANNON
BY
ATTORNEY

Patent Number

2,715,157

Patented Aug. 9, 1955

2,715,157

TELEGRAPH SIGNAL BIAS AND DISTORTION METER

William D. Cannon, Metuchen, N. J., assignor to The Western Union Telegraph Company, New York, N. Y. a corporation of New York Application March 5, 1954, Serial No. 414,418

20 Claims. (Cl. 178—69)

This invention relates to a bias and distortion meter for indicating or measuring bias and distortion present in permutation code telegraph signals, and more particularly to the detection either of bias or distortion in marking and spacing teleprinter signals.

In everyday operation sections of a telegraph circuit are variably interconnected to form through circuits or distributive networks and it is necessary not only that the circuits and equipment be compatible with each other, but that signals as measured from point to point do not exceed prescribed tolerances in regard to bias and distortion. The signal quality as measured at connecting points permits prediction of the behavior of interconnected circuits, whereby adjustments may be made to provide the best possible correction where needed. Many attempts have been made heretofore to solve the problem of providing a reasonably accurate device which could be widely furnished to field offices for measuring bias and distortion of telegraph signals, particularly start-stop telegraph signals, but prior devices have in general been unduly complicated and expensive.

The instant device is relatively simple and inexpensive, and is adapted to measure the bias in telegraph signals whether they be transmitted from a multiplex distributor or from a start-stop type of distributor. In the case of multiplex transmission, marking and spacing signals are always of the same length when unbiased, but in the case of start-stop transmitters some differences are found in different machines such that marking signals are not always of the same length. To avoid this difficulty, and to provide universal applicability, the device herein utilizes the spacing signals only. The device is adapted to measure the average length of successive spacing pulses and indicates on a zero-center meter any departure from standard length, as represented by a reference potential, and also is adapted for the measurement of signal distortion individually with respect to said pulses, in contradistinction to the measurement of the average length of successive ones of the pulses. The measuring device is of ordinary panel or case size, is simple to operate, gives reasonably accurate readings under all circumstances, and may be produced at a lower cost than any similar device heretofore obtainable.

The measuring set disclosed herein has relatively low impedance so that it may be introduced in series with ordinary teleprinter loops or other telegraph circuits without significantly altering their normal operating conditions. The line relay of the set, which receives the incoming signals to be tested, preferably is a polar relay and is provided with a biasing winding through which a biasing current of predetermined value is caused to flow, for example, 35 milliamperes, to give unbiased operation on 70 milliampere single current signals applied to the operate windings of the relay. If the incoming signals to be measured are polar instead of single current signals, the biasing circuit of the line relay is opened.

When measured at the mean, or 35 milliampere bias value, considerable variations in length in the incoming signals may be present, and when so measured would indicate a serious degree of bias. However, a teleprinter receiving such signals may well provide satisfactory operation for the reason that the armature of the printer magnet starts to move with the initiation of a marking signal and may make contact some time before the full signal value is reached. Likewise, upon initiation of a spacing signal the armature will leave its marking contact before the signal current reaches zero. It is evident, therefore, that the signal shape as measured in the incoming line circuit does not invariably represent the printing performance of the teleprinter magnet and mechanism. As a means of securing a reading of bias which will more nearly correspond to printer performance, the device disclosed herein is arranged to measure signal bias under two different testing conditions. The first condition, in which a steady bias current of 35 ma. is maintained in the biasing windings of the receiving line relay of the bias and distortion meter, gives true readings when the received signals, both biased and unbiased, are symmetrical. The term "symmetrical" is used herein to designate signals in which the wave shape of the current is the same for a transition from marking to spacing as for a transition from spacing to marking, and this condition may obtain in biased signals as well as in unbiased signals. The second condition gives more representative readings in the case of non-symmetrical signals, and is obtained by means for altering the bias of the receiving line relay automatically during reception of spacing signals so that on transitions from marking to spacing the line relay will have, for example, a 50 ma. bias, and on the transition from spacing to marking the bias on the relay is reduced, for example, to 20 ma. so that operation of the relay from marking to spacing, and spacing to marking, transitions occur after a change of 20 ma. from either the initial marking or spacing condition. The bias and distortion meter also is adapted to be readily changed for operation at different transmitting speeds, for example, at any of three speeds such as 65, 75 and 100 words per minute. The device is easily changed from one speed to another since only simple changes are required for the bias indicating section and no addition changes are required in the distortion indicating section; when the circuit parameters are adjusted correctedly for bias indication the circuit parameters are automatically correct for distortion indication.

Among the objects of the instant invention are to provide an improved bias meter which measures the average departure of signal length from a reference length expressed as a fixed reference voltage; to prevent incorrect indications in the event of a received signal having a pulse length that exceeds an unbiased signal unit interval by a predetermined amount, for example, a signal exceeding 1.5 normal pulse length; to provide a precision method for holding a relay operated in the bias meter for a specified time, for example, 1.5 pulse length; to provide an improved circuit for measuring time intervals in which only the initial and relatively linear portion of a condenser charge or discharge is employed; to provide suitable means for compensating grid current and other potentials in a thermionic measuring device of the character disclosed; to measure the length of incoming spacing signals as defined by the time interval between the beginning of the transitions respectively from marking to spacing followed by spacing to marking under different bias conditions of the receiving line relay in a manner to indicate the actual performance of a telegraph printer in response to such signals; and to provide means for comparing the maximum departure of spacing signal length with that of the average unbiased spacing signal in a manner to indicate signal distortion when present in the incoming line signals.

Other objects and advantages will be apparent from the following detailed description of a preferred embodiment of the invention, taken in connection with the accompanying drawings, in which:

Fig. 1 shows the circuit arrangement of a bias and distortion meter in accordance with the instant invention, which may be plugged into either a multiplex or a start-stop telegraph line for detecting bias or distortion present in the signals transmitted over the line; and Figs. 2 to 6 disclose a plurality of wave forms used to explain the advantages and method of operation of the meter.

Referring to Fig. 1, relays A, B and C each is a conventional type of relay commonly employed in telegraph practice, and each of the relays has four windings 1, 2, 3, and 4 connected in various circuit arrangements as required for the operation of the meter. Windings 1 and 2 are operate windings, and 3 and 4 are biasing windings, for each of the relays. Relay A is a line receiving relay for the meter which, by means of a two-conductor plug 12, may be plugged into a jack that is connected to the telegraph line under test, so that the signals transmitted over the line will pass through the two operate coils 1 and 2 and cause the relay A to follow the line signals. By reason of the parallel connection of the operate coils, the relay has relatively low impedance and thus the bias and distortion meter may be inserted in series with ordinary teleprinter loops or other telegraph circuits without significantly altering their normal operating conditions. Relay B functions as a "stop" relay in the meter circuit, and relay C functions as a "start" relay, in a manner hereinafter described. Normally both relays B and C are biased, by means of their coils 3 and 4, to their spacing, or break, contacts S.

Figure 2:
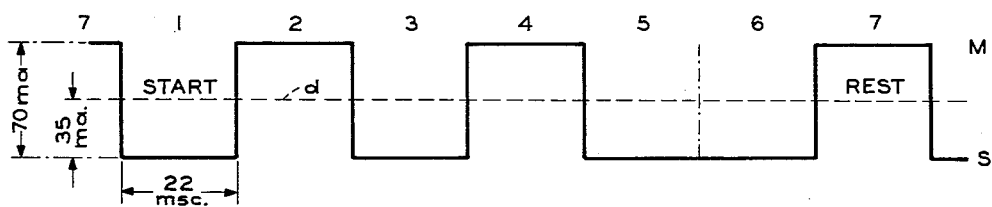
Figure 3:
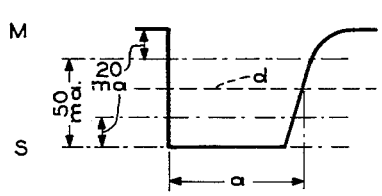
Figure 4:
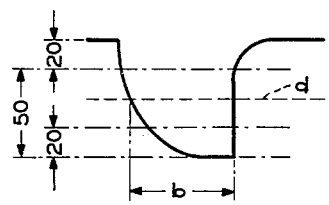
Figure 5:
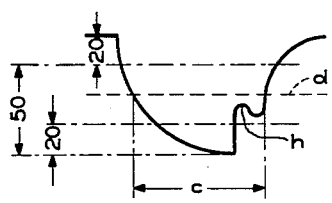
Figure 6:
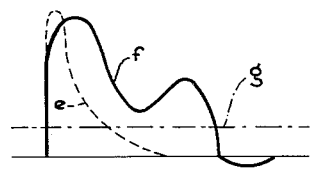

Fig. 2 illustrates the signal pulses comprising a single character as transmitted from a start-stop distributor, including the five character pulses together with a spacing start pulse and a marking rest pulse, and commonly referred to as a seven unit code. On one standard type of start-stop printer the standard signal pulse length is 22 milliseconds; the signals in the operate windings of the line relay are 70 milliampere signals; and a 35 milliampere biasing current is maintained in the biasing windings of the relay, as indicated by the dash line $d$. Fig. 3 illustrates the wave shape of a distorted spacing signal which has a length $a$ (with a 35 ma. bias operation as indicated at $d$) that is longer than normal and hence introduces spacing bias; the 20 and 50 ma. biasing values, indicated by the dot-and-dash lines, are explained hereinafter. Fig. 4 shows the wave shape of a distorted spacing signal which has a shorter length $b$ than normal and hence introduces marking bias. Fig. 5 shows the wave shape of a spacing signal which has a length $c$ that is longer than normal, and which also indicates an irregularity $h$ resulting from a reflection from the teleprinter line.

A single-pole switch S1 of Fig. 1 and associated circuits enable the relay A to operate either on polar signals or on single current start-stop signals, and circuits controlled by a double-pole switch S2 enable the meter to measure bias under either of two different conditions respectively for giving readings when the signals are symmetrical and when they are non-symmetrical. A four-pole switch S3 controls circuits for causing the meter to measure either bias or fortuitous and other distortion, which conditions respectively are indicated by microammeters M1 and M2. A rotary switch S4 is manually rotatable to either of three operative positions 1, 2 and 3 respectively for changing the parameters of certain timing circuits hereinafter described to enable the meter to respond to three different signal-transmitting speeds, for example, 65, 75 and 100 words per minute. In position 1 of switch S4 as shown, the meter circuit is adapted to receive 65 words per minute.

When switch S1 is moved to its left hand position, as shown in Fig. 1, the line relay A is normally biased towards its marking contact M, and is in condition to receive single current start-stop teleprinter signals, since a biasing circuit is established from a source 14 of positive battery, through switch S1, conductor 16, biasing windings 3 and 4 of the line relay, conductor 15, right hand blade of switch S2, and resistor 20 to ground. In a line relay of the type illustrated and adapted to operate on 70 milliampere single current signals, if the source of positive battery 14 has a potential of 140 volts and the resistor 20 has a value of 3700 ohms, a steady biasing current of 35 milliamperes will be maintained in the windings 3 and 4 of the relay. If the signals to be measured are polar instead of single current, the switch S1 is moved to its right hand position, thus opening the circuit through the biasing windings 3 and 4 of relay A. The marking contact M is connected through a resistor 17 to a source 18 of positive battery, and the spacing contact S is connected through a similar resistor 17 to a source 19 of negative battery. The battery sources 18 and 19 preferably have potentials of $+140$ volts and $-140$ volts, respectively, and the resistors 17 each has a value of approximately 800 ohms.

The armature or tongue of the relay is connected by a conductor 21 to a voltage divider comprising resistors 22 and 23, and thence to ground; resistor 22 preferably has a value of 0.13 megohm and resistor 23 a value of 10,000 ohms. Resistors 24 and capacitors 25 are surge killers connected across the relay contacts. A neon lamp 27 and a resistor 26 are connected to the conductor 21; when the tongue of relay A is on the marking contact M, one-half of the tube 27 lights, and when the tongue is on the spacing contact S, the other half of the tube lights, thereby giving a visual indication of the presence of marking and spacing signals in the line under test.

As a time measuring means, the initial portion of the charging time of a capacitor from a constant, or direct current, potential source is used, which results in a substantially linear scale. The discharge principle of a capacitor also can be employed with satisfactory results. For this purpose a capacitor 28 and a resistor 30 are used, and which upon operation of relay B to its marking, or make, contact M, transfers into a storing and integrating capacitor 32. In the specific circuit illustrated, capacitor 28 has a value of 0.25 mfd.; resistor 30 has a value of 0.28 megohm; the integrating capacitor 32 has a value of 2 mfd.; resistor 52 has a value of 0.22 megohm; and a leak resistor 53 has a value of 22 megohms. Energy may be subtracted as well as added to the integrating capacitor. The voltage across this capacitor then is proportional to the integrated value of the charges added and subtracted, and is the voltage which determines the deflection of the bias indicating meter M1 from its center position. A radio frequency choke coil 54 is inserted in the conductor 51, and a small grounded condenser 55 serves to by-pass high frequencies produced by opening and closing of the contacts of relay B. In the circuit of the operate windings 1 and 2 of relay B, conductor 48 has a resistor 46 and a grounded rectifier 45 connected thereto; this prevents a pulse of negative polarity, produced by the tongue and spacing contact S of relay A, from operating relay B since the rectifier 45 will conduct such a pulse to ground. Therefore only a pulse of positive polarity, produced by the tongue and marking contact M of relay A will operate relay B. The resistance 46 is for the purpose of slowing up the rise of current in the rectifier 45, which otherwise would produce interfering high frequencies in the system.

When the switch S3 is in the bias-measuring position as shown, a relatively small capacitor 59 having a value of 0.05 mfd. is connected in parallel with the integrating capacitor 32 by means of the first and third blades of the switch. The small capacitor 59 thus is charged to the same potential as capacitor 32, but does not affect the reading of the meter M1 when taking bias readings. As hereinafter explained, the small capacitor is operative when measuring distortion, at which time the switch S3 is thrown to its right hand position and the small capacitor is no longer in parallel with capacitor 32.

*Operation of circuit for measuring bias*

The line relay A when operated to its spacing contact S by an incoming spacing signal, operates the "start" relay C by a pulse over a circuit comprising negative battery 19, resistor 17, spacing contact S and tongue of relay A, conductor 21, capacitors 34 and 35 in parallel, inductor 36, rectifier 37, resistor 38, and operate windings 1 and 2 of relay C to ground. In order to insure positive and precise operation of relay C at the beginning of a spacing transition with prompt reverse operation at a particular interval of time, which preferably is 1.5 unbiased spacing signal unit, or 33 milliseconds, and LC network is included in circuit with the operate windings of the relay. This network comprises an inductor 40 and capacitors 41, 42 and 43. In the absence of this LC, or pulse-stretcher, network the discharge of the two capacitors 34 and 35 would promptly reach a peak value and then decay towards zero along a gradually slopping path as indicated by the dotted line curve $e$ in Fig. 6 of the drawings. The operation of the relay in this sloping region would be irregular and would be unreliable as a time reference. The LC network, however, in combination with the inductance of the relay superimposes an oscillation of approximately 1 spacing unit length upon the discharge of capacitors 34 and 35 and is timed to plunge to zero value at precisely 33 msc. following the initial transition from marking to spacing at relay A. Due to the network the operate current in relay C has a wave shape such as indicated by the solid line curve $f$ in Fig. 6. The dot-and-dash line $g$ represents the biasing current in the windings 3 and 4 of the relay. In the particular circuit illustrated, suitable values for capacitors 34 and 35, respectively, are 1.0 mfd. and 2.0 mfd.; inductors 36 and 40, respectively, are 11.3 henries and 22.7 henries; resistor 38 is 560 ohms; capacitors 41 and 42 are each 0.5 mfd.; and capacitor 43 is 1.0 mfd. The rectifier 37 in series with relay C prevents tailing of the oscillations which otherwise would cause chattering of the relay. On a transition from S to M of relay A, the capacitors 34 and 35 (which in parallel have a capacity of 3 mfd.) are charged from a rectifier 44 to ground, but this charging current is blocked from relay C by the rectifier 37. The precise and positive operation of relay C is effective in stabilizing the operation of the measuring set and avoids the necessity of making critical adjustments. A pulse longer than 1.5 spacing signal unit does not affect the bias measurement since the stop relay B is conditioned, by the tongue and contacts of relay C, for operation for a period not longer than 1.5 pulse, and hence any longer spacing pulse is rejected.

Prior to the operation of relay C, a short circuit was maintained around the timing capacitor 28, this circuit comprising the tongue and spacing, or break, contact S of relay B, conductor 29, resistor 31, and the spacing contact S and tongue of relay C. Operation of relay C removes this short circuit, thus allowing the capacitor 28 to begin to charge through the resistor 30 which has a value (0.28 megohm) such that at the end of the spacing period, if of standard length for 65 words per minute, i. e., 22 milliseconds, the voltage across the capacitor will have reached a standard reference value, in the instant case 37.0 volts. At the same time, the relay C closes, through its tongue and marking, or make contact M, a circuit for the operate coils 1 and 2 of the stop relay B, thus conditioning relay B for operation when relay A returns to its marking contact M. Relay B is operated by a pulse from battery 18, marking contact M and tongue of relay A, conductor 21, capacitor 47, conductor 48, operate windings 1 and 2 of relay B, and contact M and tongue of operated relay C to ground.

Relay B thus operates to its marking, or make, contact M momentarily to switch the timing capacitor 28 from its charging circuit to a discharge circuit including the conductor 51 and resistor 52 and the storing and integrating capacitor 32.

The capacitor 32 is normally biased by a neutralizing reference potential of 37.0 volts applied thereto by a conductor 56, so that spacing signals of zero bias will produce a zero potential across the capacitor. The neutralizing or reference potential is obtained from a point 57 on a voltage divider 58. The leak resistor 53 is connected across the capacitor 32 in order to slowly return the bias meter M1 to its zero-center position when the instrument is not active. The leak resistor has a sufficiently high resistance value, such as 22 megohms, so that it does not interfere with the integration of the charges that are added to and subtracted from the capacitor 32. The meter M1 is connected in the plate circuit of a twin triode vacuum tube V1, the two sections T1 and T2 of which form a bridge circuit for obtaining plus or minus meter indications. Tube V1 preferably is a No. 5963 tube which is an improved 12AU7 type, although a 6SN7 tube may be used in lieu thereof. The grid of section T2 of tube V1 is connected to the conductor 56. A variable resistance 60 is employed for centering the two sections of the tube.

When the charge on the storing and integrating capacitor 32 is zero the meter M1 will read zero. If the spacing signals are longer than normal the timing or measuring capacitor 28 will be charged to a potential in excess of the reference potential, which will result in a potential on the storing capacitor 32 of a value that corresponds to the increase in length over an unbiased spacing signal, and in a direction to deflect the meter M1 to the left as viewed in Fig. 1. If the spacing signals are shorter than normal the capacitor 28 will be charged to a potential less than the reference potential, which will result in a potential stored on the capacitor 32 of a value that is proportional to the decrease in length from an unbiased spacing signal, and in a direction to deflect the meter M1 to the right as viewed in Fig. 1. The extent of the meter deflection is caused to correspond to the bias-indicating voltages thus obtained, by use of a suitable meter shunt 62 to give approximately the desired result, and providing a fine adjustment by a suitable resistor 63 that bridges the cathodes of the tube V1. Resistors 64 in the cathode circuits provide negative feedback which results in greater stability. An important feature of the foregoing arrangement is that the grid circuits of tube V1 offer such high impedance that the charge on the integrating capacitor 32 does not leak off and hence true integration is obtained, in contrast to prior bias meters in which the operation of an indicating instrument depends upon continually leaking off the charge on a storage capacitor.

As hereinbefore stated, considerable variations in length of the signals may be indicated when measured at the mean, or 35 ma., bias value of relay A, and yet a teleprinter receiving such signals might provide satisfactory operation. Therefore, the signal shape as measured in the line circuit does not infallibly represent the printing performance of the teleprinter magnet and mechanism. The first testing condition hereinbefore described gives true readings when the signals are symmetrical; and the second testing condition now to be explained gives more representative readings in the case of non-symmetrical signals such as are illustrated in the three distorted signal shapes shown in Figs. 3, 4 and 5, respectively. This second testing condition is accomplished by means of a supplemental circuit which alters the bias of the line relay A during reception of spacing signals so that on a transition from marking to spacing the line relay bears a 50 ma. bias, and on the transition from spacing to marking the bias is reduced to 20 ma. Thus the operation of the relay for both M to S and S to M transitions occurs after a change of 20 ma. from the initial marking or spacing condition, as indicated by the dot-and-dash lines in Figs. 3 to 5. A difference in the degree of signal bias as measured under the 35 ma. and the 20–50 ma. bias of relay A generally indicates a distorted wave shape and suggests to the operator an investigation and correction of this trouble.

The second testing condition is effected by throwing switch S2 to its right hand position, as viewed in Fig. 1, thereby to cause the bias current through the windings 3 and 4 of relay A to be supplied from a vacuum tube V2, which preferably is a 7A5 pentode. The screen grid of the tube is now connected through switch S2 to the source 14 of positive potential, and the plate circuit of the tube is connected through the switch so that a biasing circuit for relay A is established from positive battery 14, through switch S1, biasing windings 3 and 4 of relay A, conductor 15, right hand blade of switch S2, and tube V2 through a variable resistor 70 to ground. The voltage divider comprising resistors 22 and 23 is connected to the control grid of tube V2 and insures the proper swing on the grid to cause the output of tube V2 to swing from 20 to 50 ma., and vice versa. When the tongue of relay A is on the spacing contact S, negative potential is applied to the grid of tube V2, at which time a current of 20ma. flows in the plate circuit of the tube; when the tongue of relay A is on the marking contact M, positive potential is applied to the grid of V2 and a current of 50 ma. flows in its plate circuit. Resistors 71 and 72 and condenser 73 comprise an RC network for causing the grid voltage to change slowly from one value to the other, i. e., slightly less than one dot cycle, since the time required to change from one signal condition to another is slightly less than the length of a normal unbiased spacing signal. This relatively slow change from one state to another prevents false operation of the relay A on certain types of distorted wave forms. As will appear from the foregoing, the biasing current supplied by tube V2 is such that for a transition from S to M, relay A operates with a 20 ma. bias and for a transition from M to S the relay operates with a 50 ma. bias. Thus relay A operates near the beginning of each transition. Figs. 3, 4 and 5 illustrate, by means of dot-and-dash lines, that on transitions from marking to spacing the line relay A bears a 50 ma. bias, and on the transition from spacing to marking the bias is reduced to 20 ma., so that the operation of the relay occurs after a change of 20 ma. from the initial marking or spacing condition.

*Operation of circuit for measuring distortion*

In the measurement of bias, as hereinbefore set forth, the indicated value on the meter M1 corresponds to the average of the length of the spacing signals. The measurement of distortion, however, involves ascertaining the maximum departure, during a specified time interval, of the length of either the shortest or the longest spacing signal, as desired, from the average value of the incoming spacing signals, and hence requires a peak measuring device, whereas the bias measuring instrument is an averaging device. In other words, the distortion measuring circuit operates by measuring the amount that either the shortest or the longest spacing signal length departs from the average spacing signal length. For measuring distortion the switch S3 is thrown to its right hand position, and the meter bridge circuit, instead of responding to the average value of the charge on capacitor 32 is made responsive to the peak value of the charge on capacitor 59.

For distortion measurement the capacitors 32 and 59 are separated and are reconnected, by means of the switch S3, in series with each other between the grids of sections T1 and T2 of the tube V1, so that the indication of the meter M2 for distortion measurement represents the difference between the potentials on these capacitors.

This series circuit may be traced from the grid of section T2, conductor 56, capacitor 32, resistor 52, capacitor 59, connection 74, second blade of switch S3, and conductor 61 to the grid of section T1 of the tube V1. The purpose of the resistor 52, which may have a value, for example, of 0.22 megohm, is to cause the peak value of the pulse received from the timing capacitor 28 to be stored on capacitor 59 rather than on capacitor 32, i. e., the average value of the pulses will be stored on capacitor 32, whereas the peak value will be stored on capacitor 59. The resistor 52 increases the impedance presented to a rectifier, which preferably comprises a section T3 of a vacuum tube V3, so that the capacitor 59 will be charged to the full peak value for a single pulse received from capacitor 28. This resistor would degrade bias measurement by slowing the response then and hence is shorted out for bias measurement.

The rectifier section T3 has its cathode and plate elements connected together by a conductor 82 so that it operates as a diode; the grid element of section T3 is connected by conductors 66 and 79 to one side of the capacitor 59, and the plate and cathode elements of the diode are connected by a conductor 81 to the source 57 of reference potential, so that the value of the charge stored on capacitor 59 will be compared with the value of the reference potential 57. The tube V3 may comprise a 6SN7 type, but preferably is a high quality vacuum tube such as No. 5963. The rectifier T3 is so poled that for undistorted signals, the grid of section T1 of tube V1 has the same potential as the grid of the reference section T2 of the tube, but shorter spacing pulses stored on the capacitor 59 are in such direction as to depress the grid potential on T1, and since the rectifier T3 prevents the charge on capacitor 59 from leaking off, the meter M2 will be deflected to indicate the degree of distortion. This meter reading holds for a substantial period, and this period may be increased when the grid potential is further depressed by the receipt of still shorter spacing signals. A capacitor 80 is bridged across the terminals of the rectifier T3 to bypass interfering high frequencies. Grounded capacitor 83, having a capacity of 80 mfd., serves as a bypass for residual hum from the power supply.

The contact potential in the rectifier T3 may under certain circumstances comprise a source of error for low values of distortion. This error can be made negligible by operating the heater of the tube at reduced potential. It has been found that the contact potential is much less when the grid and cathode are used as the active diode elements, the plate being connected to the cathode for the purpose of eliminating any space charges that may be developed by this element.

The diode section T3 will have a potential from capacitor 28 applied across it in the conducting direction by an amount greater than zero in proportion to the amount that the shortest spacing signal differs from the average signal length. The potential on the capacitor 59 will accordingly be changed by the diode T3 to a new value corresponding to the shortest spacing signal length, while the capacitor 32 due to the large amount of integration will be maintained at a potential corresponding to the average signal length. If desired, the connections 66 and 81 may be reversed, and the connections 65 and 68 reversed at the meter M2, in which case the longest spacing signal relative to the average length will be measured to give an indication of the distortion as measured in percentage of an unbiased spacing signal. The distortion meter M2 will then indicate by a deflection to the right, the distortion corresponding to the difference between the potentials on the capacitors 32 and 59. This distortion indication is independent of whether the bias meter M was deflected to the left or to the right when the switch S3 was in the bias-reading position, and is a true measure of the difference between the average signal length and either the shortest signal length or the longest signal length of the incoming spacing signals, depending upon the connections to the rectifier T3 and meter M2.

If the spacing signals received are all of the same length, the distortion meter will read zero, regardless of whether the bias meter would have been deflected to the left or to the right with the switch S3 in the bias-reading position, since the grids of sections T1 and T2 of tube V1 have the same applied potential. Under this condition the potential across the capacitor 59 does not change since pulses transferred to the circuit by relay B are of a value such as to raise the potential across the diode T3 in the conducting direction, only to zero and thus contributes no current to the capacitor 59. The distortion indicator M2 is automatically reset to zero at the end of each time interval of observation since its circuit is reset each time the switch S3 is thrown back to the bias measurement position.

It is desirable that the distortion indication remain substantially fixed for each maximum indication until the circuit is reset. This condition requires that the capacitor 59 have a very low leakage and also that the section T1 of tube V1 have very low grid current. The effect of any leakage of the charge on the capacitor 59 can be obviated or compensated by the use of an additional section T4 of tube V3 in a compensating circuit which includes conductor 61, resistor 75 and a voltage divider 76. This arrangement functions by supplying a compensating current of a few microamperes over conductor 61 to the grid of section T1, which compensation current is opposite in polarity to the current that leaks off of capacitor 59. This compensating current is adjusted by variation of the voltage divider 76 in the cathode circuit of section T4.

As hereinbefore stated, the rotary switch S4 is shown in position 1, at which time the circuit is adapted for signaling speeds of the order of 65 words per minute, and in which the unit length of the signal is 22 msc. When the two arms or wipers of the switch are moved to position 2, capacitor 43 is effectively removed from the pulse-stretcher circuit, thereby to cause the decay time of the flux in the operate windings of relay C to be decreased, and hence reduce the interval of time that the armature of relay C remains on the contact M. The lower arm of the switch in position 2 connects a resistor 85 in parallel with the resistor 30; resistor 85 has a value of approximately 1.2 megohms and the resistance of 30 and 85 in parallel is reduced to a value that causes capacitor 28 to be charged at a rate suitable for operation at 75 words per minute. For receiving signals at the rate of 100 words per minute, the switch S4 is moved to position 3, and in this position capacitors 42 and 43 are effectively removed from the pulse stretcher circuit, and capacitor 34 is eliminated from the operating circuit of relay C, thus further reducing the decay time of the flux in the operate windings of the relay. A timing resistor 86 is connected in parallel with the timing resistor 30; a suitable value for resistor 86 is 0.47 megohm. The foregoing changes effected in positions 2 and 3 of the switch cause precise operation of relay C at the beginning of a spacing transition with prompt reverse operation at an interval equal to 1.5 times the normal pulse length. No changes in the circuit other than those mentioned in regard to the pulse-stretcher network in the operate circuit of relay C and the timing circuit for the capacitor 28 are required in order to accommodate any of the three transmission speeds referred to. The timing circuit disclosed for relay C enables bias up to the extent of 50% to be measured, and this is the highest percentage of bias that has to be measured in a circuit of this character since if the bias should exceed 50% the entire teleprinter circuit would be inoperative. It is to be understood, however, that any percentage of bias up to 50% will be measured by the system illustrated.

While the circuit herein described is adapted to measure bias up to a maximum of 50% of a unit signal length, for certain purposes it may be necessary only to measure bias which is substantially less than 50%, for example, 25% maximum bias, and in such case the constants of the timing circuit which controls the operation of relay C may be changed accordingly. Thus, a cycle of operation of the armature of relay C from its contact S to its contact M and back to the contact S may be equal to an interval corresponding to a unit pulse length plus any desired fractional part thereof less than one-half of a unit pulse length. In the system shown in the drawing the normal bias of the line relay A is 35 ma. for the reception of 70 ma. signals, but the bias on the line relay may be varied in the case of printer signals having a value other than 70 ma.; for example, in certain systems 60 ma. is employed for the line signals, and a bias of 30 ma. is employed for the line relay. With regard to the first and second testing conditions obtainable when the switch S2 is thrown to its right hand position as viewed in Fig. 1, the 20–50 ma. bias may be changed to 15–55 ma. bias or other suitable values. In the reception of 60 ma. signals, a 15–45 ma. bias on relay A ordinarily would be employed.

Preferably, the same source of negative potential is used for the separate functions of charging the timing capacitor 28 and for providing the reference potential 57 against which the charge transferred from capacitor 28 is compared. Both of these functions are critical, and the use of a common source of potential provides self-compensation and so avoids the need for specially regulated power supplies. In a less critical degree similar compensation occurs between the operating and biasing windings of relays B and C. These self-compensations materially contribute to the low cost of the device.

Various modifications of the apparatus and circuit arrangements illustrated, and various equivalents or substitutes for the devices depicted, readily will occur to those versed in the art without departing from the spirit or scope of the present invention. The disclosure, therefore, is for the purpose of illustrating the principle of the invention which is not to be regarded as limited except as indicated by the scope of the appended claims.

What is claimed is:

1. In a telegraph bias meter for indicating the amount of marking or spacing bias present in incoming permutation code signals, a timing capacitor for temporarily storing a charge corresponding to the length of each individual spacing signal as received, means responsive to a signal transition from marking to spacing for applying to said capacitor a charging potential to cause the voltage across the capacitor to rise proportionally with time during the interval of each said spacing signal, an integrating capacitor and means responsive to a succeeding transition from spacing to marking for transferring the charge on said timing capacitor to said integrating capacitor, means including said integrating capacitor and a source of reference voltage representing an unbiased spacing signal interval for determining the magnitude and polarity of the difference voltage between said reference voltage and the voltage appearing across said integrating capacitor representing the average length of the individual spacing signals being received, an indicating device controlled by said difference voltage for indicating the amount of marking or spacing bias present in said signals, and means for preventing the charge on said integrating capacitor from leaking off to said indicating device comprising vacuum tube structure having anode, cathode and control electrodes and including circuit connections for applying said difference voltage to a control electrode of the vacuum tube structure and for energizing said indicating device from an anode-cathode circuit of said structure.

2. A meter according to claim 1, in which said vacuum tube structure comprises a pair of sections of anode, cathode and control electrodes connected to form a bridge circuit for obtaining plus or minus meter indications, and including means for connecting said reference potential to the control electrode of one section and said integrating capacitor to the control electrode of the other section, a source of anode potential and resistance means connected across the anodes of said sections for electrically centering the sections, and means connecting said indicating device in circuit with said anodes.

3. A meter according to claim 2, including negative feedback resistors in the cathode circuits of said vacuum tube sections and operative to increase the stability of the indicating circuit.

4. In a telegraph bias meter for indicating the amount of marking or spacing bias present in permutation code signals, a relay having a biasing winding and an operate winding for actuating the relay armature between marking and spacing contacts in response to said signals, a capacitor and means for applying to the capacitor a charge corresponding to the length of each individual spacing signal received by said relay, means including said capacitor and a source of reference voltage representing an unbiased spacing signal for determining the magnitude and polarity of the difference voltage between said reference voltage and the voltage appearing across said capacitor, an indicating device controlled by said difference voltage for indicating the amount of marking or spacing bias present in said signals, and means including circuit connections for automatically applying to the biasing winding of said relay a biasing current of one value on a transition from marking to spacing and a biasing current of a different value on a transition from spacing to marking during the reception of said signals.

5. A meter according to claim 4, in which the circuit connections for automatically supplying different values of biasing current are controlled by the armature and the marking and spacing contacts of said relay.

6. A meter according to claim 4, in which the means for automatically applying the biasing current to said relay applies a biasing current of a given value on a transition from marking to spacing and a biasing current of a lower value on a transition from spacing to marking.

7. A meter according to claim 4, in which a vacuum tube in circuit with the biasing winding of the relay controls the value of the biasing current therein, said vacuum tube having its control grid connected to the armature of the relay, and additional circuit connections operative when the armature is on the spacing contact to apply negative potential to said grid and produce a biasing current of reduced value, and operative when the armature is on the marking contact to apply positive potential to said grid and produce a biasing current of increased value.

8. A meter according to claim 4, in which the means for automatically applying the biasing currents of two different values produces biasing currents respectively having values substantially equally above and below the median value of the current in said code signals to cause the operation of said relay, for marking to spacing and spacing to marking transitions, to occur after the same change in the current value of said signals from the initial marking or spacing condition.

9. A meter according to claim 7, including a network in the grid circuit of the vacuum tube for causing the grid voltage to change slowly from one value to the other in a time interval slightly less than that of a normal unbiased spacing signal.

10. A telegraph bias meter for indicating the amount of marking or spacing bias present in permutation code signals under two different testing conditions, comprising a relay having a biasing winding and an operate winding for actuating the relay armature between marking and spacing contacts in response to said signals, a capacitor and means for applying to the capacitor a charge corresponding to the length of each individual spacing signal received by said relay, means including said capacitor and a source of reference voltage representing an unbiased spacing signal for determining the magnitude and polarity of the difference voltage between said reference voltage and the voltage appearing across said capacitor, an indicating device controlled by said difference voltage for indicating the amount of marking or spacing bias present in said signals, means for establishing a first testing condition comprising switching means and circuit connections controlled thereby for applying to the biasing winding of said relay a biasing current having a value substantially equal to the median value of the current in said code signals, and means for establishing a second testing condition comprising said switching means and circuit connections controlled thereby and operative on a transition from marking to spacing for applying to said biasing winding a biasing current of a value greater than that of said first named biasing current, and operative on a transition from spacing to marking for applying a biasing current of a value less than that of said first named biasing current.

11. A telegraph bias and distortion meter circuit for indicating the amount of marking or spacing bias, or alternatively the amount of distortion, present in permutation code signals, comprising a first capacitor for temporarily storing a charge corresponding to the length of each individual spacing signal as received, means responsive to a signal transition from marking to spacing for applying to said capacitor a charging potential to cause the voltage across the capacitor to rise proportionally with time during the interval of each said spacing signal, means including a second capacitor for storing a charge representing the average length of the received spacing signals, means including a third capacitor for storing a charge representing the maximum departure in the length of an individual spacing signal from that of the average spacing signal, means responsive to a succeeding transition from marking to spacing for transferring a pulse representing the charge on said first capacitor to said second and third capacitors, circuit means including a source of reference voltage representing an unbiased spacing interval for determining the magnitude and polarity of the difference voltage between the reference voltage and the voltage appearing across either said second or third capacitor, indicating devices controlled by said difference voltage and respectively operative to indicate the amount of bias and the amount of distortion present in said signals, and switching means and circuits controlled thereby for alternatively connecting said second capacitor to the bias-indicating device and said third capacitor to the distortion-indicating device.

12. A meter circuit according to claim 11, in which said third capacitor is sufficiently small in size relative to said second capacitor to cause the peak value of a pulse received from said first capacitor to be stored on the third capacitor rather than on said second capacitor on which a charge representing the average value of the pulses is stored.

13. A meter circuit according to claim 12, in which said switching means connects said second and third capacitors in parallel for a bias-indicating measurement, and connects said capacitors in series for a distortion-indicating measurement.

14. A meter circuit according to claim 12, including a rectifier connected across said third capacitor and so poled as to substantially prevent the charge on the capacitor from leaking off.

15. A meter circuit according to claim 14, including means for applying to the distortion-indicating circuit a current opposite in polarity to, and compensating for, the current which leaks off of said third capacitor.

16. A telegraph bias meter for indicating the amount of marking or spacing bias present in permutation code signals, comprising a timing capacitor for temporarily storing a charge corresponding to the length of each individual spacing signal as received, a relay having an operate winding and an operating circuit for said winding of the relay, means for transmitting an energizing pulse over said operating circuit in response to a signal transition from marking to spacing, means controlled by said relay for applying a charging potential to said timing capacitor to cause the voltage across the capacitor to rise proportionally with time, an integrating circuit and means including a transfer relay controlled by the energization of said first named relay for transferring the charge on the timing capacitor to the integrating circuit, and means comprising a network in the operating circuit of said first named relay for stretching said energizing pulse to keep the relay energized until a period has elapsed which comprises the interval of an unbiased spacing signal plus an interval corresponding to the maximum percent of spacing bias that may be measured by the bias meter.

17. A bias meter according to claim 16, including a switching means settable to different positions respectively corresponding to different signalling speeds at which the permutation code signals are transmitted, and circuit connections controlled by the switching means for changing the parameters of said network to vary the effective length of said energizing pulse in accordance with said different signalling speeds.

18. A bias meter according to claim 17, including means controlled by said switching means for changing the value of said charging potential applied to the timing capacitor in accordance with said different signalling speeds.

19. A telegraph bias meter for indicating the amount of marking or spacing bias present in permutation code signals, comprising a timing capacitor for temporarily storing a charge corresponding to the length of each individual spacing signal as received, a first relay having an armature operative between marking and spacing contacts in response to said code signals, a second relay having an operate winding and an armature operative between a break contact and a make contact and means for biasing the armature toward its break contact, an operating circuit for said winding of the second relay, means comprising the first relay for transmitting an energizing pulse over said operating circuit in response to a signal transition from marking to spacing, means operative when the armature of said second relay leaves its break contact for applying a charging potential to said timing capacitor to cause the voltage across the capacitor to rise proportionally with time, an integrating circuit and means including a transfer relay having its operate winding controlled by the armature and make contact of said second relay for transferring the charge on the timing capacitor to the integrating circuit, and means comprising a network in the operating circuit of said second relay for stretching said energizing pulse to prevent the armature of the relay from leaving its said make contact until a period has elapsed which comprises the interval of an unbiased spacing signal plus an interval corresponding to the maximum percent of spacing bias that may be measured by the bias meter.

20. Telegraph apparatus for receiving single current marking and spacing signals respectively under two different receiving conditions, comprising a relay having a biasing winding and an operate winding for actuating the relay armature between marking and spacing contacts in response to said signals, and means for substantially compensating for marking or spacing bias present in said received signals, comprising circuit connections controlled by said relay and operative on a transition from marking to spacing for applying to said biasing winding a biasing current of a predetermined value greater than the median value of the current in said received signals, and operative on a transition from spacing to marking for applying a biasing current of a value less than that of said median value.

References Cited in the file of this patent

UNITED STATES PATENTS

| | | |
|---|---|---|
| 2,360,702 | Martin et al. | Oct. 17, 1944 |
| 2,568,019 | Martin | Sept. 18, 1951 |
| 2,587,561 | Wilder | Feb. 26, 1952 |

FOREIGN PATENTS

| | | |
|---|---|---|
| 621,955 | Great Britain | Apr. 25, 1949 |